Sept. 5, 1950          V. L. DAVIS          2,521,348
ENDLESS CONVEYER FOR VIEWING APPARATUS
Filed March 31, 1947          2 Sheets—Sheet 1
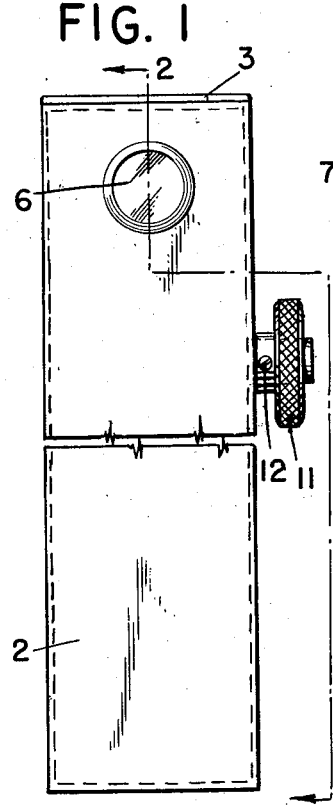
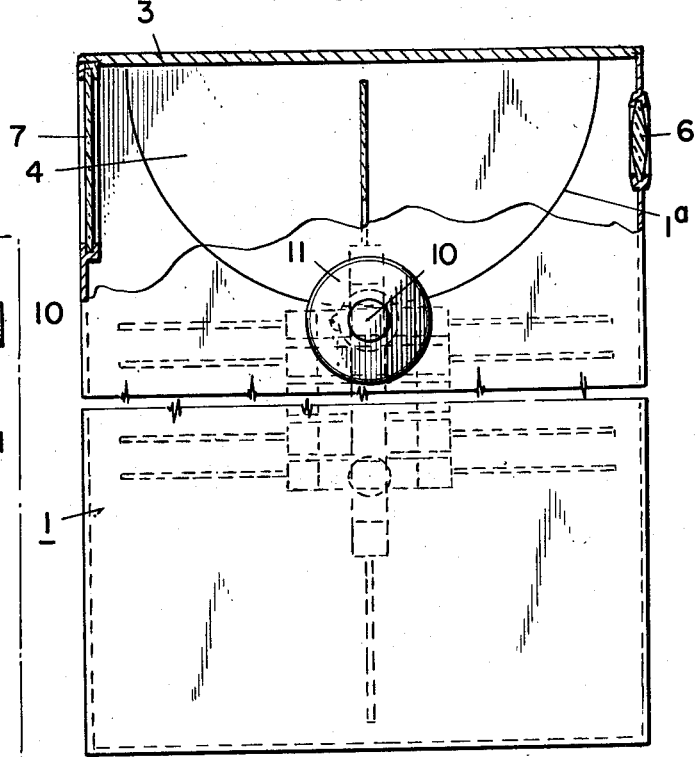
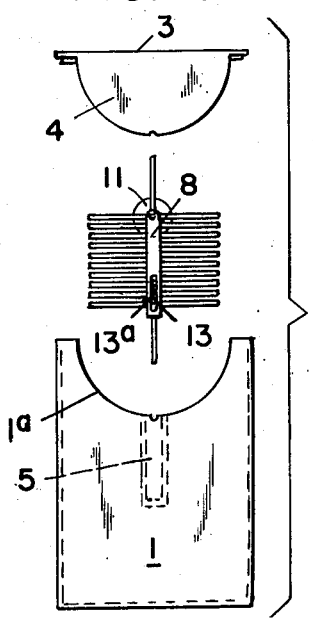
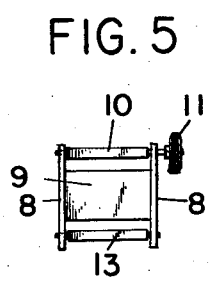
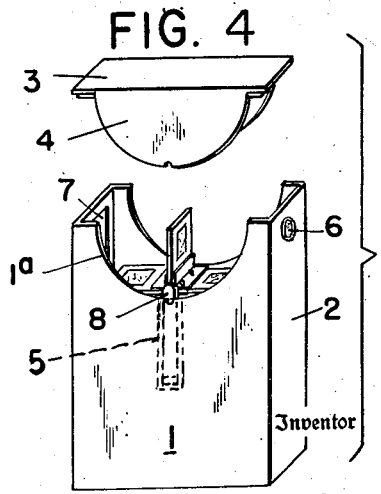
VERNE L. DAVIS,
Stone, Boyden & Mack
Attorneys.

Sept. 5, 1950  V. L. DAVIS  2,521,348
ENDLESS CONVEYER FOR VIEWING APPARATUS
Filed March 31, 1947  2 Sheets-Sheet 2
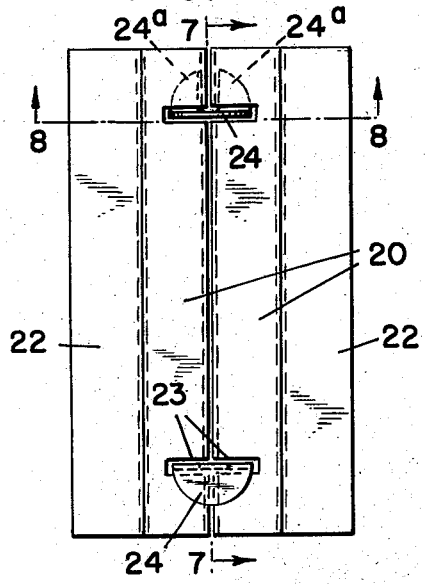
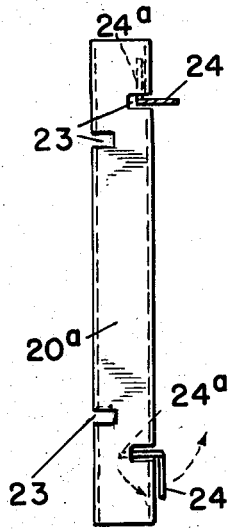
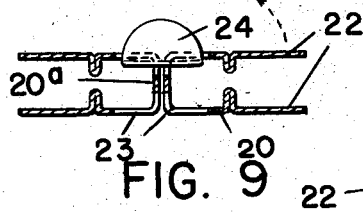
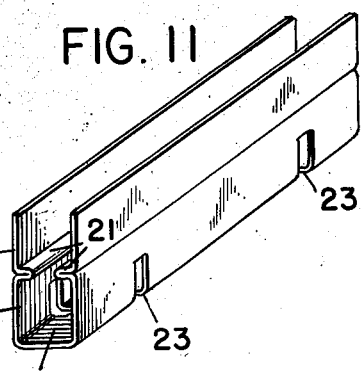
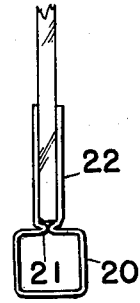
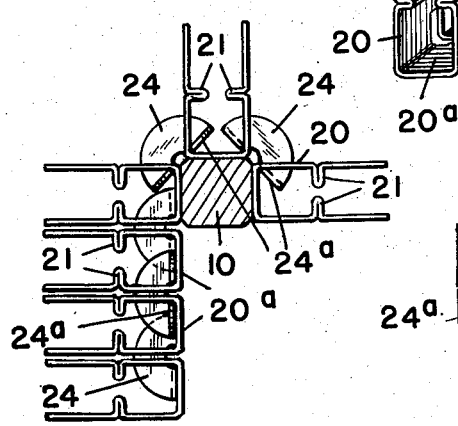
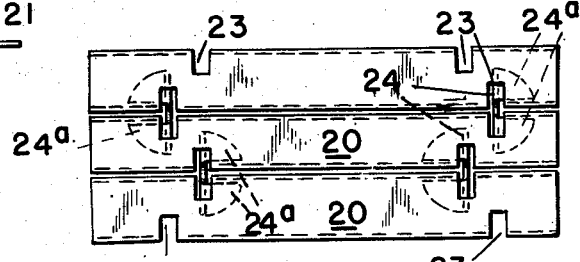
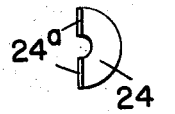
Inventor
VERNE L. DAVIS,
By Stone, Boyden & Mack
Attorneys Patented Sept. 5, 1950

2,521,348

UNITED STATES PATENT OFFICE 2,521,348

ENDLESS CONVEYER FOR VIEWING APPARATUS

Verne L. Davis, La Crescenta, Calif.

Application March 31, 1947, Serial No. 738,403

12 Claims. (Cl. 40—98)

This invention relates to an improved endless conveyor assembly and to the specific connecting elements which in their assembled relation constitute a complete conveyor.

The mechanism of this invention is adapted to the carrying of various kinds of loads and it may be used in conjunction with various cooperating devices. However, one of its principal functions is in the moving of objects, loads or material lengthwise of the path of travel of its endless conveyor belt or chain.

One adaptation of this conveyor assembly is in a picture viewing apparatus in which, for example, pictures or cards, preferably transparencies, are moved in sequence into viewing position in front of a lens or into the path of a beam of light. The method of assembling the conveyor elements and the use of the conveyor will be described in connection with a viewing apparatus. However, it will be clear that the use of the conveyor is not limited to viewing apparatus.

One of the features of this invention is a mechanism by which it is possible to load an endless conveyor unit with a series of pictures to be displayed whereby the entire conveyor and assembly of pictures may be inserted into a viewing device and removed therefrom after the pictures have been displayed.

The foregoing and additional features and advantages are described and claimed in the following specification and claims, and will be apparent when considered in connection with the accompanying drawings, in which:

Fig. 1 is an elevational view looking at one end face of a display device in which the conveyor of this invention may be used, showing the operating wheel and lens;

Fig. 2 is an elevational view partly in section, looking at the side of Fig. 1, and taken on the line 2—2 of Fig. 1;

Fig. 3 is a side view of the casing, conveyor assembly and cover of the device shown in Fig. 2, exploded to show the conveyor and cover elevated from their assembled positions;

Fig. 4 is a perspective view of the parts shown in Fig. 3 with the conveyor in position in its casing and showing the use of picture slides in the conveyor;

Fig. 5 is a side elevational view of the conveyor frame shown in Fig. 3;

Fig. 6 is a view showing the position of two adjacent conveyor elements at the moment when the interconnecting links are being inserted, whereby adjacent links are united to form the endless conveyor;

Fig. 7 is a sectional view taken on the line 7—7 of Fig. 6;

Fig. 8 is an end view taken on the line 8—8 of Fig. 6;

Fig. 9 is a side view of a portion of the endless conveyor looking at the ends of the conveyor elements and showing the operating axle in section;

Fig. 10 shows a modification of the assembly of conveyor elements and interconnecting links wherein interconnecting links are faced in opposite directions;

Fig. 11 is a perspective view of one of the conveyor elements shown in Figs. 6-10 inclusive;

Fig. 12 is a view of one of the interconnecting links at its preliminary stage of construction showing its original shape prior to being bent;

Fig. 13 shows one of the interconnecting links in its completed form and with the spaced tabs projecting at right angles from the semi-circular portion; and Fig. 14 shows a modification of one of the conveyor elements in which the work retaining walls are spaced not so far apart as the work retaining walls in the conveyor elements shown in Figs. 8-11 inclusive.

Referring in detail to the several views of the drawings, like reference characters identify like parts.

The casing for a viewing device is indicated in Figs. 1 and 2 as having side walls 1 and end walls 2. It will be apparent that the structure shown in Figs. 1 and 2 is broader along the walls 1 than at the walls 2. The walls 1 and 2, with the bottom thereof and the cover, comprise a substantially rectangular box. A lid or cover plate for the box is indicated at 3, and its end edges are recessed on the under surface to permit the cover 3 to be seated evenly over the upper opening of the box. The upper edge portions of the side walls 1 are provided with downwardly extending notches having curved walls 1ª, Figs. 2, 3 and 4. The cover 3 has corresponding downwardly extending plates 4 at opposite sides thereof to match the curvature of the walls 1ª and to complete the contour of the rectangular box.

The walls 1 are provided with grooves 5 for the reception and mounting of a picture conveying and actuating apparatus (Figs. 2 and 3). The grooves 5 are located on the opposite and inner faces of the walls 1 and extend from the lowermost point of the curved portions 1ª downwardly part way along the length of the side walls. The grooves 5 extend only part way through the thickness of the walls 1 and are not visible from the exterior of those side walls. The conveyor mechanism and assembly of pictures carried thereby is introduced into the box by sliding the mechanism downwardly into the grooves 5.

After the conveyor mechanism and picture assembly has been introduced into the box, and into the position shown in Figs. 2 and 4, the pictures may be viewed through a lens 6, which is located in one of the end walls 2, while light from a suitable external source may pass through a ground glass or other light diffusing medium indicated at 7, which is positioned in the end wall 2 opposite to that wall in which the lens is located.

The conveyor mechanism for carrying the pictures includes a frame member (Fig. 5) having three essential parts which are rigidly connected with respect to each other. This frame member includes end elements 8, each of which is shown as having the shape of a plate member with a length greater than its width, (Figs. 3 and 5). In between each plate member 8 and firmly connected to both of them, as by welding, is an intermediate plate or web 9. This assembly lies substantially in a fixed plane and is substantially rigid.

The conveyor mechanism is operated by an upper axle 10 which is journalled in the plate elements 8 for a free turning movement, (Figs. 2 to 5). An operating wheel 11 is indicated as mounted on one end of the axle 10 and is adapted to be positioned exteriorly of the viewing box. The wheel 11 may be removed or secured to the stub end of the axle 10 by means of a set screw 12 (Fig. 1). The lowermost portion of the conveyor assembly is adapted to pass downwardly and beneath and thence upwardly around a lower axle 13 which is likewise freely rotatable and is journalled in the lower portions of the plates 8. By reference to the exploded side view of the conveyor assembly shown in Fig. 3, it will be noted that the lower axle 13 is slidably mounted in slots in the plates 8 and is adapted to be urged downwardly by springs 13a located in the side plates 8.

The details of the endless conveyor and the manner of interconnecting the adjacent elements thereof will now be described. Fig. 11 illustrates a typical link element of the endless conveyor and which conveyor is composed of a plurality of such elements positioned face to face and hinged to each other by means of common interconnecting elements. The typical conveyor element shown in Fig. 11 is substantially U-shaped in general appearance, looking at one end thereof. The element may be formed of sheet metal or of some other relatively stiff durable composition. A modern thermoplastic may serve satisfactorily if both tough and rigid. The U-shaped element has side walls 20 and a connecting web 20a. Part way up along each of the side walls is an inwardly projecting rib or ledge 21 which is shown in Fig. 11 as constituting a crimped portion of the side wall. Above the ledge 21, the side walls are extended upwardly and in substantially parallel relation, as indicated at 22. Work to be carried by the conveyor is adapted to be embraced by the side walls 22 and the lower edge of the work is adapted to rest on the upper face of the ledge 21. Typical work to be carried by such conveyor elements, as shown in Fig. 11, are picture slides, plates or the frames for transparencies to be used in viewing apparatus. Such an assembly of plates so mounted on a conveyor in a viewing apparatus is indicated diagrammatically in Figs. 3 and 4.

Means whereby adjacent conveyor elements, such as that shown in Fig. 11, are assembled in operative relation, involves the use of interconnecting links which function in conjunction with certain slots located in the side walls and web wall of the conveyor elements as will now be described. The conveyor elements are equipped with notches or slots 23, which extend part way up the side walls 20 and part way across the web wall 20a, thus as recesses cut into the lower edges of the right angle formed by the side walls 20 and web wall 20a.

The hinge elements or interconnecting elements are formed of flat sheet material, preferably of metal. Preferably, also, these articles are initially substantially circular in outline and are provided with an inwardly extending radial notch, as shown in Fig. 12, when first cut or stamped from sheet metal. The portions spaced apart by the notch are indicated at 24a and these portions are next bent to a position 90° with respect to the main semi-circular portion and along a line which is substantially the diameter of the original circular stamping. The completed element is thus shown in Fig. 13, with the projecting tabs 24a extending at right angles to the main portion 24. It will thus be observed that the tabs 24a have a curved outer periphery and that the main portion 24 has one peripheral edge which is substantially the arc of a half circle. The completed article thus shown in Fig. 13 is used to interconnect adjacent conveyor elements of the type shown in Fig. 11.

In assembling the conveyor elements, two or more conveyor elements are positioned with their web walls 20a in abutting relation. The interconnecting element is then inserted by introducing the projecting tabs 24a into the notches or slots 23 in the side walls 20, as shown in the position at the bottom portion of Figs. 6 and 7, and in which position the tab portions 24a extend within the U-shaped conveyor element. Next the interconnecting element of Fig. 13 is rotated, thus in the direction of the arrow shown in Fig. 7, and so that the inwardly projecting tabs 24a assume a position as shown at the upper end of Fig. 7, with the tabs extending parallel to the inner face of the side wall 20. Thereafter, when the two conveyor elements shown in Fig. 6 are moved from the position shown in Figs. 6 and 8 to a position in which the side walls are abutting and the web walls lie in a common plane, the inwardly projecting tabs 24a move to a position parallel to the inner surface of the web wall 20a of the conveyor elements, thus as shown in the assembly at the lower part of Fig. 9.

The linkage described in the foregoing provides for flexibility of movement when the conveyor elements are passing around the upper axle and while they are thus being actuated by the operating handle. In the arrangement shown in Figs. 2 and 9, the axle 10 is provided with a square shank, each face of which is substantially equal to the width of each of the conveyor elements whereby rotation of the shaft serves to progressively move the conveyor elements one by one into and step by step from the vertical position, such as is indicated in Fig. 9. During that progressive movement, the interconnecting links are so positioned that the semi-circular periphery 24a extends substantially in the plane of the movement of the conveyor elements. As the conveyor elements pass from one face to another around the axle 10, the interconnecting elements 24 are adapted to rock slightly and within certain limits with respect to the adjacent conveyor elements which they interconnect, thus as illustrated in Fig. 9. In that arrangement, the tabs 24ᵃ move away from the parallel position against the bottom wall while passing upwardly to a position above the axle 10 but assume that parallel position with respect to the web wall 20ᵃ after leaving the upper axle. A similar movement is repeated at the lowermost point of the conveyor assembly while passing around the lower axle 13.

In Fig. 6, the arrangement of the interconnecting links with respect to the conveyor elements is peculiar in that the tabs project from the slots toward the adjacent ends of the conveyor elements. A modification of that arrangement is shown in Fig. 10, in which the interconnecting elements are so inserted that their tab portions 24ᵃ project in opposite directions at opposite ends of two adjacent conveyor elements and likewise in different directions at the same end of each individual conveyor element. In this latter arrangement, the projecting tabs 24ᵃ are less subject to interference one with the other when passing around the axles 10 and 13 than when they project in the same direction.

The modification of the conveyor element shown in Fig. 14 provides a convenient shape for the reception of glass slides or relatively thin objects. In this arrangement, the article embracing walls 22 are closer together than are the side walls 20. Likewise the upper walls 22 are not in the same plane with the corresponding side walls 20. In the modification shown in Fig. 14, however, the function of the rib or ledge 21 is the same as that in the article shown in Fig. 11. In other words, according to both Figs. 11 and 14, the lower portion is adapted to receive the interconnecting element of Fig. 13 and must be broad enough to accommodate the interconnecting element portions 24 and 24ᵃ, whereas the distance between the upper walls 22 can be predetermined as desired.

It will be apparent that the contour of the conveyor elements of Figs. 11 and 14 are preferably much longer than the thickness thereof whereby the walls 22 may receive and firmly hold such articles as picture cards, slides and other transparencies and so that those articles will not slip out during the time that the conveyor elements are moving upwardly and downwardly and beneath the lower axles.

It will be apparent that it is essential that all of the conveyor elements in any one assembly be substantially identical. It will also be apparent that when the adjacent elements are arranged side by side for reception of the interconnecting elements, they must be so positioned that the slots 23 of adjacent links are opposite each other. If at first the slots of one element about to be added to a conveyor assembly are not directly opposite the slots of the next adjacent element, all that is necessary is to reverse the ends of that element which is being added.

I claim:

1. In an endless conveyor, a series of carrier elements each having an article supporting portion and a base portion for receiving connecting elements common to adjacent carrier elements, said base portion including a web wall and two side walls spaced from each other and extending from opposite sides of said web wall and away from the plane thereof, each of said side walls and said web wall having slots extending part way across said web wall and part way up the side walls at opposite sides of said base portion, and a connecting element extending into said slots of the base portions of adjacent carrier elements, each connecting element having one flat portion substantially half circular in contour which is adapted to lie in the plane of the path of movement of said conveyor and to extend into adjacent slots of adjacent carrier elements, and each said connecting element having spaced securing tabs projecting at right angles to said half circular portion, one tab lying parallel with the inner surface of the bottom of one carrier element and the second of said tabs lying parallel to the inner surface of the adjacent carrier element.

2. In an endless conveyor, a series of carrier elements each having an article supporting portion and a base portion for receiving connecting elements common to adjacent carrier elements, said base portion including a web wall and two side walls spaced from each other and extending from opposite sides of said web wall and away from the plane thereof, each of said side walls and said web wall having slots extending part way across said web wall and part way up the side walls at opposite sides of said base portion, and a connecting element extending into said slots of the base portions of adjacent carrier elements, each connecting element having one flat portion which is adapted to lie in the plane of the path of movement of said conveyor and to extend into adjacent slots of adjacent carrier elements, and each said connecting element having spaced securing tabs projecting at right angles to said flat portion, one tab lying parallel with the inner surface of the bottom of one carrier element and the second of said tabs lying parallel to the inner surface of the adjacent carrier element.

3. In an endless conveyor, a series of carrier elements each having an article supporting portion and a base portion for receiving connecting elements common to adjacent carrier elements, said base portion including a web wall and two side walls spaced from each other and extending from opposite sides of said web wall and away from the plane thereof, each of said side walls and said web wall having slots extending part way across said web wall and part way up the side walls at opposite sides of said base portion, a connecting element extending into said slots of the base portions of adjacent carrier elements, each connecting element having one flat portion substantially half circular in contour which is adapted to lie in the plane of the path of movement of said conveyor and to extend into adjacent slots of adjacent carrier elements, and each said connecting element having spaced securing tabs projecting at right angles to said half circular portion, one tab lying parallel with the inner surface of the bottom of one carrier element and the second of said tabs lying parallel to the inner surface of the adjacent carrier element; and a driving shaft adapted to support a connected series of said carrier elements and having a width substantially the equal of the width of the bottom wall of a carrier unit.

4. A carrier element for an endless conveyor having substantially parallel side walls and a connecting web wall, said element being open at the edge opposite from said web wall for the reception of an object to be conveyed, each of said side walls and said web wall having slots extending part way across said web wall and part way up the side walls at opposite sides of said web wall, and a connecting element extending into said slots of the web walls of adjacent carrier elements, each connecting element having one flat portion substantially half circular in contour which is adapted to lie in the plane of the path of movement of said conveyor and to extend into adjacent slots of adjacent carrier elements, and each said connecting element having spaced securing tabs projecting at right angles to said half circular portion, one tab lying parallel with the inner surface of the web wall of one carrier element and the second of said tabs lying parallel to the inner surface of the web wall of the adjacent carrier element.

5. A carrier element for an endless conveyor having substantially parallel side walls and a connecting web wall, said element being open at the edge opposite from said web wall for the reception of an object to be conveyed, each of said side walls and said web wall having slots extending part way across said web wall and part way up the side walls at opposite sides of said web wall, and a connecting element extending into said slots of the web walls of adjacent carrier elements, each connecting element having one flat portion which is adapted to lie in the plane of the path of movement of said conveyor and to extend into adjacent slots of adjacent carrier elements, and each said connecting element having spaced securing tabs projecting at right angles to said half circular portion, one tab lying parallel with the inner surface of the web wall of one carrier element and the second of said tabs lying parallel to the inner surface of the web wall of the adjacent carrier element.

6. A carrier element for an endless conveyor having substantially parallel side walls and a connecting web wall, said element being open at the edge opposite from said web wall for the reception of an object to be conveyed, each of said side walls and said web wall having slots extending part way across said web wall and part way up the side walls at opposite sides of said web wall, a connecting element extending into said slots of the web walls of adjacent carrier elements, each connecting element having one flat portion substantially half circular in contour which is adapted to lie in the plane of the path of movement of said conveyor and to extend into adjacent slots of adjacent carrier elements, and each said connecting element having spaced securing tabs projecting at right angles to said half circular portion, one tab lying parallel with the inner surface of the web wall of one carrier element and the second of said tabs lying parallel to the inner surface of the web wall of the adjacent carrier element, and a limit stop within said carrier element comprising a ledge extending transversely from one side wall toward the opposite side wall and located at a point between the upper edge of said side wall and the nearest edge of said slots.

7. A carrier element for an endless conveyor having substantially parallel side walls and a connecting web wall, said element being open at the edge opposite from said web wall for the reception of an object to be conveyed, each of said side walls and said web wall having slots extending part way across said web wall and part way up the side walls at opposite sides of said web wall, a connecting element extending into said slots of the web walls of adjacent carrier elements, each connecting element having one flat portion substantially half circular in contour which is adapted to lie in the plane of the path of movement of said conveyor and to extend into adjacent slots of adjacent carrier elements, and each said connecting element having spaced securing tabs projecting at right angles to said half circular portion, one tab lying parallel with the inner surface of the web wall of one carrier element and the second of said tabs lying parallel to the inner surface of the web wall of the adjacent carrier element, and a limit stop on each side wall within said carrier element comprising a ledge extending transversely from one side wall toward the opposite side wall and located at a point between the upper edge of said side wall and the nearest edge of said slots.

8. In a picture viewing device, a casing having spaced apart a light diffusing source including a ground glass and a lens, an endless conveyor within said casing for moving into and out of alignment between said ground glass and said lens, a series of picture transparencies, said conveyor including an upper horizontal axle extending transversely to a line between said ground glass and said lens, a lower axle parallel to said upper axle, a series of carrier elements interconnected and constituting an endless conveyor and passing over said upper horizontal axle and depending therefrom and extending around and beneath said lower axle, said endless conveyor including a series of carrier elements each having a base portion and an article supporting portion for receiving connecting elements common to adjacent carrier elements, said base portion including a web wall and two side walls spaced from each other and extending from opposite sides of said web wall and away from the plane thereof, each of said side walls and said web wall having slots extending part way across said web wall and part way up the side walls at opposite sides of said web wall, and a connecting element extending into said slots of the base portions of adjacent carrier elements, each connecting element having one flat portion substantially half circular in contour which is adapted to lie in the plane of the path of movement of said conveyor and to extend into adjacent slots of adjacent carrier elements, and each said connecting element having spaced securing tabs projecting at right angles to said half circular portion, one tab lying parallel with the inner surface of the web wall of one carrier element and the second of said tabs lying parallel to the inner surface of the web wall of the adjacent carrier element.

9. In an endless conveyor a carrier element substantially U-shaped in cross section and having a length transversely of said U greater than the distance between the sides of the U, said element being open at the edge opposite to the web wall of the U and at the opposite ends of the U for the reception of an object to be conveyed, said carrier element having slots extending part way across the web wall and part way up the side walls at opposite sides of said web wall, for the reception of coupling elements adapted to connect similar adjacent carrier elements.

10. A carrier element substantially of channel section in which the distance between the parallel sides is less than the length of the web of the channel, each of said parallel sides and said web having slots extending part way across the web and part way up the sides for the reception of connecting elements adapted to connect adjacent carrier elements.

11. A connecting element for connecting links of an endless conveyor, which element is of sheet metal and consists of a flat portion substantially half circular in contour, and having two tabs projecting at right angles to said half circular portion from the edge of said half circular portion along the diameter side thereof, said tabs being spaced from each other and each of them having an outer marginal edge of substantially the same curvature as the curvature of said half circular portion.

12. A connecting element for connecting links of an endless conveyor, which element consists of a flat portion substantially half circular in contour, and having two tabs projecting at right angles to said half circular portion from the edge of said half circular portion along the diameter side thereof, said tabs being spaced from each other and lying in the same plane.

VERNE L. DAVIS.

REFERENCES CITED

The following references are of record in the file of this patent:

UNITED STATES PATENTS

| Number | Name | Date |
| --- | --- | --- |
| 391,938 | Boussemaere | Oct. 30, 1888 |
| 1,357,389 | Evans | Nov. 2, 1920 |
| 1,764,950 | Griner | June 17, 1930 |
| 1,785,506 | Vance | Dec. 16, 1930 |
| 1,925,671 | Mansfield | Sept. 5, 1933 |